United States Patent
Bohli et al.

(10) Patent No.: US 11,048,805 B2
(45) Date of Patent: Jun. 29, 2021

(54) METHOD FOR STORING DATA ON A STORAGE ENTITY

(71) Applicants: NEC LABORATORIES EUROPE GMBH, Heidelberg (DE); UNIVERSITAET MANNHEIM, Mannheim (DE)

(72) Inventors: Jens-Matthias Bohli, Leimen (DE); Ghassan Karame, Heidelberg (DE); Frederik Armknecht, Worms (DE)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 15/999,360

(22) PCT Filed: Feb. 17, 2016

(86) PCT No.: PCT/EP2016/053384
§ 371 (c)(1),
(2) Date: Sep. 19, 2018

(87) PCT Pub. No.: WO2017/140358
PCT Pub. Date: Aug. 24, 2017

(65) Prior Publication Data
US 2019/0108350 A1    Apr. 11, 2019

(51) Int. Cl.
*G06F 21/00* (2013.01)
*G06F 21/60* (2013.01)
(Continued)

(52) U.S. Cl.
CPC .......... *G06F 21/602* (2013.01); *G06F 3/0619* (2013.01); *G06F 3/0643* (2013.01);
(Continued)

(58) Field of Classification Search
CPC .... G06F 21/602; G06F 3/0619; G06F 3/0643; G06F 21/64; G06F 21/6218;
(Continued)

(56) References Cited

U.S. PATENT DOCUMENTS 8,909,967 B1 * 12/2014 van Dijk ................. H04L 9/06
                                                   713/330
8,918,647 B1 * 12/2014 Wallrabenstein ... H04L 63/0807
                                                  713/172
(Continued)

OTHER PUBLICATIONS

Mihir Bellare et al: "Interactive Message-Locked Encryption and Secure Deduplication", International Association for Cryptologic Research,, vol. 20150122:171249, Jan. 21, 2015 (Jan. 21, 2015), pp. 1-34, XP061017787.
(Continued)

*Primary Examiner* — Jeffrey C Pwu
*Assistant Examiner* — Helai Salehi
(74) *Attorney, Agent, or Firm* — Leydig, Voit & Mayer, Ltd.

(57) ABSTRACT

A method for storing data on a storage entity (SE) includes: computing a file identifier for a file to be stored on the SE; checking if the file has already been stored using the file identifier; generating a user-specific private and public identifier; updating or computing tags of the file by the client such that the updating or computing is homomorphic in the user-specific private identifier and in parts of the file; providing the user-specific public identifier, the updated tags and a proof of possession of the secret identifier to the SE; verifying the proof-of-possession; verifying validity of the tags; upon successful checking, storing a public identifier for the file incorporating the user-specific public identifier and the updated tags by the SE; and upon a case where it is determined that the file has not already been stored, storing the file.

18 Claims, 4 Drawing Sheets

(51) Int. Cl.
    *H04L 9/00*     (2006.01)
    *G06F 21/62*     (2013.01)
    *G06F 21/64*     (2013.01)
    *G09C 1/00*     (2006.01)
    *G06F 16/00*     (2019.01)
    *G06F 3/06*     (2006.01)
    *H04L 9/32*     (2006.01)
    *H04L 29/06*     (2006.01)

(52) U.S. Cl.
    CPC ............ *G06F 3/0659* (2013.01); *G06F 16/00* (2019.01); *G06F 21/6218* (2013.01); *G06F 21/64* (2013.01); *G09C 1/00* (2013.01); *H04L 9/008* (2013.01); *H04L 9/3218* (2013.01); *H04L 63/0428* (2013.01)

(58) Field of Classification Search
    CPC .... G06F 3/0659; G06F 21/62; G06F 21/6209; G06F 21/6227; G06F 21/6236; G06F 21/6245; G06F 21/6254; G06F 21/6263; G06F 21/6272; G06F 21/6281; G06F 21/629; G06F 2212/402; H04L 9/008; H04L 9/3218
    See application file for complete search history.

(56) References Cited

U.S. PATENT DOCUMENTS

| 2013/0061049 | A1* | 3/2013 | Irvine | G06F 21/6218 |
| | | | | 713/165 |
| 2013/0301830 | A1* | 11/2013 | Bar-El | H04L 63/0823 |
| | | | | 380/210 |
| 2018/0025167 | A1* | 1/2018 | Bohli | H04L 9/14 |
| | | | | 713/193 |
| 2019/0087432 | A1* | 3/2019 | Sion | G06F 21/62 |

OTHER PUBLICATIONS

Mehdi Sookhak et al: "Remote Data Auditing in Cloud Computing Environments", ACM Computing Surveys, ACM, New York, NY, US, US, vol. 47, No. 4, May 26, 2015 (May 26, 2015), pp. 1-34, XP058069760.

Frederik Armknecht et al: "Transparent Data Deduplication in the Cloud", Proceedings of the 22$^{nd}$ ACM SIGSAC Conference on Computer and Communications Security, CCS '15, Jan. 1, 2015 (Jan. 1, 2015), pp. 886-900, XP055287325.

Mukundan, Raghul et al. "Efficient integrity verification of replicated data in cloud using homomorphic encryption", Distributed and Parallel Databases, Kluwer, NL, vol. 32, No. 4, Jun. 24, 2014 (Jun. 24, 2014), pp. 507-534, XP035388814.

* cited by examiner

METHOD FOR STORING DATA ON A STORAGE ENTITY

CROSS-REFERENCE TO PRIOR APPLICATIONS

This application is a U.S. National Stage Application under 35 U.S.C. § 371 of International Application No. PCT/EP2016/053384 filed on Feb. 17, 2016. The International Application was published in English on Aug. 24, 2017 as WO 2017/140358 A1 under PCT Article 21(2).

FIELD

The present invention relates to a method for storing data on a storage entity.

BACKGROUND

Cloud services are gaining increasing importance and applicability in a number of application domains, such as storage, computing services, etc. The "cloud" has recently gained several adopters among small and medium enterprises and large businesses that are mainly interested in fast development of new applications while minimizing the costs of both deployment and infrastructure management and maintenance.

Cost effectiveness is realized in the cloud through the integration of multi-tenancy solutions and storage efficiency solutions with efficient distributed algorithms that run on commodity hardware to ensure unprecedented levels of scalability and elasticity. The combination of multi-tenancy solutions with storage efficiency techniques, e.g., data deduplication enables drastic cost reductions. For instance, recent studies show that cross-user data deduplication can save storage costs by more than 50% in standard file systems, and by up to 90-95% for back-up applications as shown in the non-patent literature of Frederik Armknecht, Jens-Matthias Bohli, Ghassan Karame, Franck Youssef, Transparent Data Deduplication in the Cloud, In Proceedings of the ACM Conference on Computer and Communications Security (ACM CCS), 2015. Moreover, nearly three quarters of these savings could also be obtained by means of whole file deduplication.

The advent of cloud storage and computation services, however the present inventors have recognized, introduces new threats to data security. Namely, in nearly all conventional cloud services, users lose control over their data and how data is processed or stored. For example, a permanent loss of customers' data in a cloud system due to lightning strikes that affect a local utility grid near a corresponding data center is possible. For example a conventional method which enables users to verify the integrity and availability of their outsourced data include Proofs of Retrievability (POR) is shown in the non-patent literature of Frederik Armknecht, Jens-Matthias Bohli, Ghassan Karame, Zongren Liu, Christian Reuter, Outsourced Proofs of Retrievability, In Proceedings of the ACM Conference on Computer and Communications Security (ACM CCS), Arizona, USA, 2014. The conventional method enables providing end-clients with the assurance that the data is retrievable.

Although these conventional methods can be effective in detecting data loss, the present inventors have recognized that these methods completely ignore storage-efficiency requirements, such as multi-tenancy and data deduplication, which are being widely utilized by existing cloud storage providers. Namely, conventional solutions assume a single trusted tenant, i.e. an honest verifier, who pre-processes the files to create tags using secret material before outsourcing them to the cloud, and later regularly performs verifications, e.g., POR on the pre-processed files and tags in order to react as early as possible in case of data loss. However, in practice, given that files are typically deduplicated across tenants, and different tenants do not tend to trust each other, tenants will be reluctant on sharing the secret material used to construct tags in POR/PDP.

On the other hand, the present inventors have recognized that solutions where each tenant constructs and stores his own tags in the cloud do not scale well with the number of tenants in the system. In this case, the storage overhead of the tags threatens to cancel out the benefits of data deduplication over popular objects; for instance, the storage overhead required to store the tags of files owned by 20 tenants is almost 200% when compared to the original file size.

SUMMARY

In an embodiment of the present invention, a method is provided for storing data on a storage entity (SE) that includes the steps of: (a) computing a file identifier for a file to be stored on the SE; (b) checking, by the SE, if the file has already been stored using the file identifier; (c) generating a user-specific private identifier and a user-specific public identifier; (d) updating or computing tags of the file by the client such that the updating or computing is homomorphic in the user-specific private identifier and in parts of the file; (e) providing the user-specific public identifier, the updated tags and a proof of possession of the secret identifier to the SE by the client; (f) verifying, by the SE, the proof-of-possession; (g) verifying validity of the tags; (h) in a case of a successful checking, storing a public identifier for the file incorporating the user-specific public identifier and the updated tags by the SE; and (i) in a case where the file has not already been stored, storing the file by the SE.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
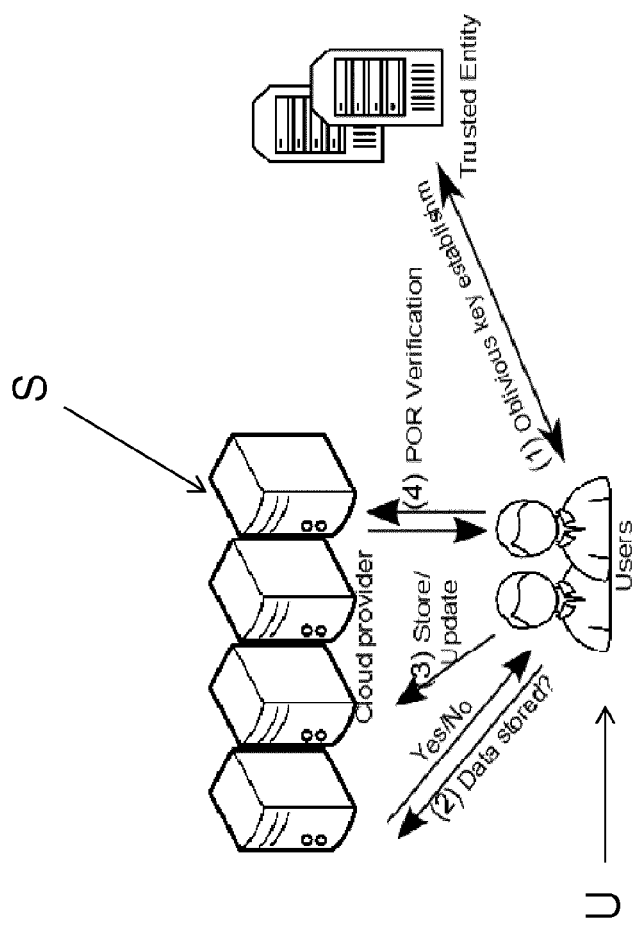
FIG. 1 shows a system according to an embodiment of the present invention.

The present invention relates to a method for performing a proof of retrievability.

Further, the present invention relates to a storage entity for storing data.

Even further, the present invention relates to a non-transitory computer readable medium storing a program causing a computer to execute a method for storing data on a storage entity.

Although applicable in general to any kind of storage entity, embodiments of the present invention will be described with regard to cloud storage.

Embodiments of the present invention provide multi-tenant publicly-verifier proofs of retrievability. Embodiments of the present invention enable proofs of retrievability in which tenants do not require to mutually trust each other. Embodiments of the present invention provide storage efficiency and a secure and easy implementation.

An embodiment the present invention provides a method for storing data on a storage entity, 'SE', that includes the steps of:
a) computing a file identifier for a file to be stored on the SE;
b) checking, by the SE, if the file has already been stored using the file identifier;
c) generating a user-specific private and a user-specific public identifier;
d) updating or computing tags of the file by the client such that the updating or computing is homomorphic in the user-specific private identifier and in parts of the file;
e) providing the user-specific public identifier the updated tags and a proof of possession of the secret identifier to the SE by the client;
f) verifying, by the SE, the proof-of-possession;
g) verifying validity of the tags;
h) upon successful checking storing a public identifier for the file incorporating the user-specific public identifier and the updated tags by the SE; and
i) if the file has not already been stored, storing the file by the SE.

In an embodiment the present invention provides a method for performing a proof of retrievability, includes the steps of:
A) downloading, by a client, a current verification key of a file stored on a storage entity according to a method of storage of an embodiment of the invention;
B) verifying correctness of said verification key by reconstructing the current verification key using the last known verification key and the user-specific public identifiers incorporated into the verification key according to the method of storage of an embodiment of the invention; and
C) upon successful verification, performing a proof-of-retrievability with the current verification key.

An embodiment the present invention provides a storage entity for storing data according to a method of embodiments of the invention, wherein a file together with a user-specific public identifier, a proof of possession and one or more file tags of the file is stored.

An embodiment the present invention provides a non-transitory computer readable medium storing a program causing a computer to execute a method for storing on a storage entity, 'SE', the method including the steps of:
a) computing a file identifier for a file to be stored on the SE;
b) checking, by the SE, if the file has already been stored using the file identifier;
c) generating a user-specific private and a user-specific public identifier;
d) updating or computing tags of the file by the client such that the updating or computing is homomorphic in the user-specific private identifier and in parts of the file;
e) providing the user-specific public identifier the updated tags and a proof of possession of the secret identifier to the SE by the client;
f) verifying by the SE, the proof-of-possession;
g) verifying validity of the tags;
h) upon successful checking storing a public identifier for the file incorporating the user-specific public identifier and the updated tags by the SE; and
i) if the file has not already been stored, storing the file by the SE.

The terms "storage entity" and "client" refer in particular in the claims, preferably in the description each to a device or devices adapted to perform computing like a personal computer, a tablet, a mobile phone, a server, a router, a switch or the like and comprise one or more processors having one or more cores and may be connectable to a memory for storing an application which is adapted to perform corresponding steps of one or more of the embodiments of the present invention. Any application may be software based and/or hardware based installed in the memory on which the processor(s) can work on. The devices or entities may be adapted in such a way that the corresponding steps to be computed are performed in an optimized way. For instance different steps may be performed in parallel with a single processor on different of its cores. Further the devices or entities may be identical forming a single computing device. The devices or devices may also be instantiated as a virtual device running on a physical computing resource. Different devices may therefore be executed on the physical computing resource.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "part" in connection of a file may refer in particular in the claims, preferably in the description, to a division of the file into a plurality of file parts, sections, blocks or the like.

At least one embodiment of the present invention may have at least one of the following advantages: (i) deduplication is enabled not only of the files but also of the proof retrievability tags across mutually untrusted tenants; (ii) different tenants do not require to share any secret material with each other; (iii) enhanced security since resistance against malicious proxy servers and cloud providers is enabled; and/or (iv) storage efficiency.

Further features, advantages and further embodiments are described or may become apparent from the present disclosure.

The user-specific public identifier and/or the user-specific secret identifier are computed as a public key/private key pair. This enable for example to provide in an easy way to proof-of-possession, for example by issuing the proof-of-possession based on the secret key for the public key.

The file may be encrypted and/or an information dispersal algorithm is applied on the file like erasure-coding prior to storing. This allows a secure pre-processing of the file to be stored. When encrypting the file then security is enhanced. When the file is erasure-coded then it can be easily utilized in a proof of retrievability ensuring extractability.

The file identifier may be generated by computing a hash tree like a Merkle tree used for a proof-of-work and using the root of the hash tree as file identifier. This enables an easy generation of a unique file identifier. Further the Merkle tree can be used for a proof-of-work and thus a security is enhanced.

For updating the file tags the file may be divided into blocks, each block comprising a number of sectors, preferably all blocks having the same number of sectors, wherein a file tag for each block is computed based on file elements, the file elements being computed based on a cryptographic hash function of the file and sector indices. This allows a reliable while secure updating of the file tags.

The user-specific public identifier may be locally stored by a client as verification key. This enables a client in an easy way to perform a later proof-of-retrievability.

An oblivious key generation protocol may be used between the client and a trusted entity to generate a deterministic private identifier/public identifier pair. This ensures that the trusted entity does not learn any information about the file to be stored for which the keys are generated. Thus security is enhanced.

In case the file is already stored, correctness of the updated tags may be checked based on already stored file elements of the file by the SE. This allows a fast and reliable verification.

For performing the proof-of-retrievability, a random challenge may be computed and provided to the SE, the random challenge comprising one or more blocks of the file and a corresponding randomly generated integer and wherein the SE computes the file tags and the sum of the product of the randomly generated integer and the sector corresponding to the integer and wherein the client verifies retrievability of the data using the file tags and the sum to generate corresponding file elements and comparing the generated file elements with locally stored file elements. This allows a fast and reliable while easy to perform proof-of-retrievability.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figures on the other hand. In connection with the explanation of the further embodiments of the invention by the aid of the figure, generally further embodiments and further developments of the teaching will be explained.

In FIG. 1, in a first step 1, an oblivious key establish mechanism between users and a trusted entity is provided. This oblivious key establishing method employs an oblivious protocol which is executed between the users and the trusted entity to generate the keys required for encrypting the files to be stored.

The trusted entity chooses two groups $\Gamma_1$ and $\Gamma_2$ with order p, and a computable bilinear map e: $\Gamma_1 \times \Gamma_2 \rightarrow \Gamma_T$. Additionally, the trusted entity chooses a private key $x \in \mathbb{Z}_p$, and the corresponding public keys $y_1$ $g_1^x \in \Gamma_1$ and $y_2 = g_2^x \in \Gamma_2$. Let $H^*: \{0, 1\}^* \rightarrow \Gamma_1$ be a cryptographic hash function which maps bitstrings of arbitrary length to group elements in $\Gamma_1$. Prior to storing a file M, the client computes $h \leftarrow H^*(M)$, blinds it by multiplying it with $g_1^r$, given a randomly chosen $r \in \mathbb{Z}_p$, and sends the blinded hash $\tilde{h}$ to the trusted entity. The trusted entity derives the signature on the received message and sends the result back to the client, who computes the unblinded signature s and verifies that:

$$e(s, g_2) = e(h^x g_1^{rx} g_1^{-rx}, g_2) = e(h, y_2).$$

The encryption key is then computed as the hash of the unblinded signature: $\kappa \leftarrow H(s)$.

The advantages of such a key generation method, are inter alia:

Since the method on which the keys are relied upon is oblivious, it ensures that the trusted entity does not learn any information about the files, e.g. about the file hash during the process. On the other hand, this method enables the client to check the correctness of the computation performed by the trusted entity (i.e., verify the signature of the trusted entity). This verification enables to prevent a rational trusted entity from registering users of the same file to different file versions with reduced level of deduplication.

By involving the trusted entity in the key generation module, brute-force attacks on predictable messages can be slowed down by rate-limiting key-generation requests to trusted entity. The security provided by the embodiment is similar to Message-Locked-Encryption MLE scheme.

In summary this encryption key is used as file key to encrypt a file to be stored.

Further, in the following, a group G of prime order p with generator g, and a computable efficient bilinear map e: $G \times G \rightarrow G_T$ are agreed before the start of the protocol. Each user U participating is required to setup a key pair. The user chooses a private key $sk_U = x \in \mathbb{Z}_p$, and the corresponding public key is then given by $pk_U = g^{sk_U} \in G$. U also needs to prove possession of the secret key in zero-knowledge. This can be achieved by issuing pop which represents a signature of the public verification key with the private signing key and can be checked by signature verification. Such a proof of possession is required to protect against a rogue-key attack, where an adversary forges the multi-signature of a group using an invalid key (i.e., a public key whose private key is unknown to the adversary).

To store a new file M, the user first has to pre-process M as follows. The U first encrypts the file using a deterministic file-key $\kappa$ obtained from the server-aided key generation protocol. The resulting file is then encoded with an erasure code as required by the utilized POR (in order to provide extractability guarantees). The result is denoted by $\tilde{M}$.

When a user U wants to store the encoded file $\tilde{M}$, the user creates a unique identifier fid by building the Merkle Tree used for the proof-of-work PoW and taking the Merkle Root as the identifier. The server checks if the according file with identifier fid is already stored and responds this information to the user.

Now two cases need to be distinguished: (i) the file has not been previously stored; and (ii) the file is already stored.

In case of (i) the following steps are performed:

The file is interpreted as n blocks, each is s sectors long. A sector is an element of $\mathbb{Z}_p$ with p being the order of G and is denoted by $m_{ij}$ with $1 \leq i \leq n$, $1 \leq j \leq s$. That is, the overall number of sectors in the file is n·s.

For each $1 \leq j \leq s$ a group element $u_j \in G$ is pseudo-randomly extracted from the file as $u_j = f(H(\tilde{M}), j)$ where H denotes a cryptographic hash function, and f a pseudo-random function mapping into the group, e.g. the BLS hash function.

A file tag on each block i is computed as follows:

$$\sigma_i = \left( f(i) \cdot \prod_{j=1}^{s} u_j^{m_{ij}} \right)^{sk_U} \tag{1}$$

User U then sets $\delta = (pk_U, \{u_j\}\ j=1 \ldots s)$ and $tg = \{\sigma_i\}_i = 1 \ldots n$. The file $\tilde{M}$, the public key $pk_U$ along with the proof of possession pop, and the file tags $\{\sigma_i\}_i = 1 \ldots n$ are uploaded and stored by the server of the cloud provider. The user stores locally $gpk_M = pk_U$ as the verification key for the file and the hash value $H(\tilde{M})$ to be able to reconstruct the values $\{u_j\}j=1 \ldots m$ later on.

The server S verifies the validity of U's key by verifying pop. Furthermore the server S checks that the tags are indeed valid for the key $pk_U$ by verifying:

$$e(\sigma_i, g) \stackrel{?}{=} e(f(i)\Pi_{j=1}{}^s u_j{}^{m_{ij}}, pk_U) \qquad (2)$$

If the key and tags are correct, the server S stores all received data $(\tilde{M}, \delta, tg)$. Moreover, the server S creates a log file that will provide the necessary information needed for any other user to verify that the keys are well formed. Here, pk log comprises information about the public key of the user and the proof of possession of the corresponding secret key, $(pk_U, pop)$.

In case of (ii) the file M is already stored and will be deduplicated, an Update protocol/method is executed in order to update the file tags on the fly, so that the new user U is also able to obtain guarantees from the POR protocol without the need to trust the correctness of the already stored tags. The new user U has already obtained $\tilde{M}$ by encryption using the server-aided key generation and erasure coding as required for the POR protocol.

The procedure Update proceeds similarly to Store in order to compute $\{\sigma_i\}_i = 1 \ldots n$ according to Equation 1. Here $\tilde{U}$, also computes $\tilde{M}$ and the hash value $H(\tilde{M})$. With the help of the hash value $H(\tilde{M})$, the values $\{u_j\}$ $j=1 \ldots m$ are derived. Instead of uploading the full file, the new user U only sends $(pk_U, pop_U, tg)$ to the sever S.

Upon reception of $(pk_U, pop_U, tg)$, the server S checks the validity of $pk_U$ using $pop_U$ and checks correctness of the newly uploaded tag using Equation 2, based on the already stored values $u_i$ (which in case of need can be reconstructed from $H(\tilde{M})$ by the server S.

If the verification succeeds, the server S updates the existing tags 6c as follows. The sever S combines the tags to form the new tags $\tilde{\sigma}_i = \sigma_i^* \cdot \sigma_i$. Due to the homomorphic properties, here of the BLS signature, the tags will be correctly formed for a key $\overline{gpk_M} = gpk_M \cdot pk_U$, where $pk_M$ is the previously stored verification key for the file and $pk_U$ the public key uploaded by the user. Finally, the server S replaces the stored tags and key by $\tilde{\sigma}_i$ and $\overline{gpk_M}$, respectively. The public key and the corresponding proof of possession of the new user $(pk_U, pop_U)$ are appended to pk log.

In step 4) a proof-of-retrievability POR verification is performed between a user U and the server S of cloud provider.

To conduct POR on M, the user U downloads the current verification key $gpk_M$ corresponding to M. First, to check the correctness of $gpk_M$, the user U retrieves pk log with the public keys and proof of possessions $(pk_U, pop_U)$ for all owners of the file M that joined after the last known key. Starting from the last known verification key $\overline{gpk_M}$, the user U multiplies all verification keys $pk \in pk$ log and verifies $gpk_M \stackrel{?}{=} \overline{gpkM} \cdot \Pi_{pk \in pk\ log}\ pk$.

Furthermore, for each $pk_U \in$ log, the user U checks the validity of the key by verifying the proof $pop_U$, i.e. a correct signature of the respective public key. If the verification succeeds, the user U accepts $gpk_M$ as the verification key for M, updates the verification key locally, and proceeds with the actual POR protocol as follows.

Figure 2:
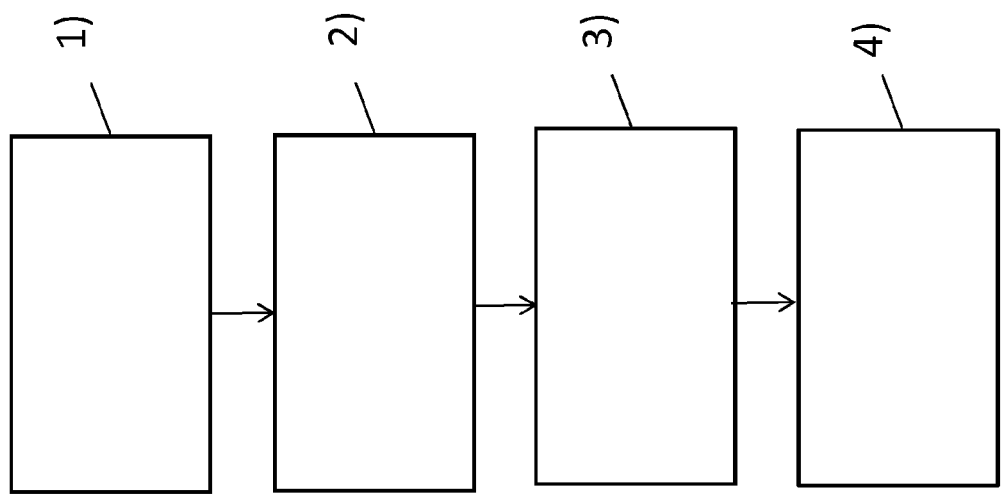
FIG. 2 shows steps of a method according to an embodiment of the present invention.

FIG. 2 shows steps of a method according to an embodiment of the present invention.

In FIG. 2 a method for storing data on entities of a cloud provider is shown including the steps of:
1) Computing file ID and sending it to the cloud provider.
2) If the file ID is stored, the file uploader downloads the latest public key, updates the tags using our homomorphic protocol. Finally, the file uploader updates the public key with his secret key, and uploads the newly corresponding public key and updated tags to the cloud.
3) The cloud checks the signature of possession on the public key of the file uploader, and if the verification passes, the cloud accepts the update and stores the updated public key and tags.
4) When an existing user wants to perform a POR verification (to check the remote integrity of the file), the user downloads the latest public key, verifies that his own private key is included in the public key, and then finally if all this verification succeeds, the user performs a POR with the cloud.

Figure 3:
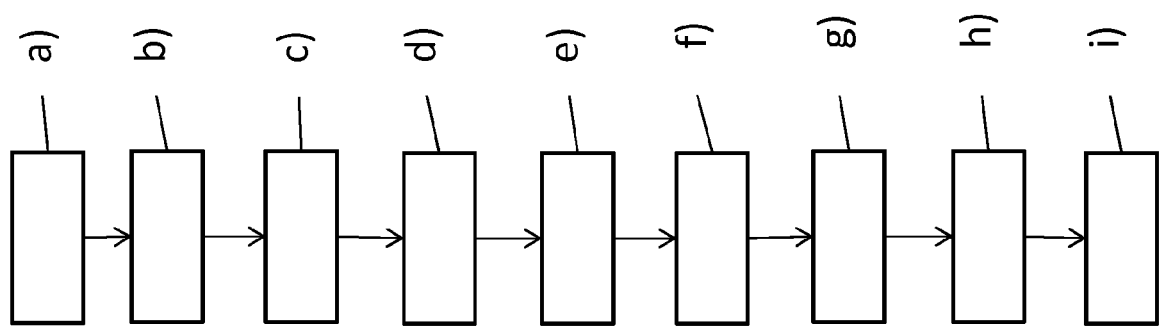
FIG. 3 shows steps of a method according to an embodiment of the present invention.

FIG. 3 shows steps of a method according to an embodiment of the present invention.

In FIG. 3, steps of a method for storing data and a storage entity, 'SE' is shown. The method includes the steps of:
a) computing a file identifier for a file to be stored on the SE;
b) checking, by the SE, if the file has already been stored using the file identifier;
c) generating a user-specific private and a user-specific public identifier;
d) updating or computing tags of the file by the client such that the updating or computing is homomorphic in the user-specific private identifier and in parts of the file;
e) providing the user-specific public identifier the updated tags and a proof of possession of the secret identifier to the SE by the client;
f) verifying, by the SE, the proof-of-possession;
g) verifying validity of the tags;
h) upon successful checking storing a public identifier for the file incorporating the user-specific public identifier and the updated tags by the SE; and
i) if the file has not already been stored, storing the file by the SE.

Figure 4:
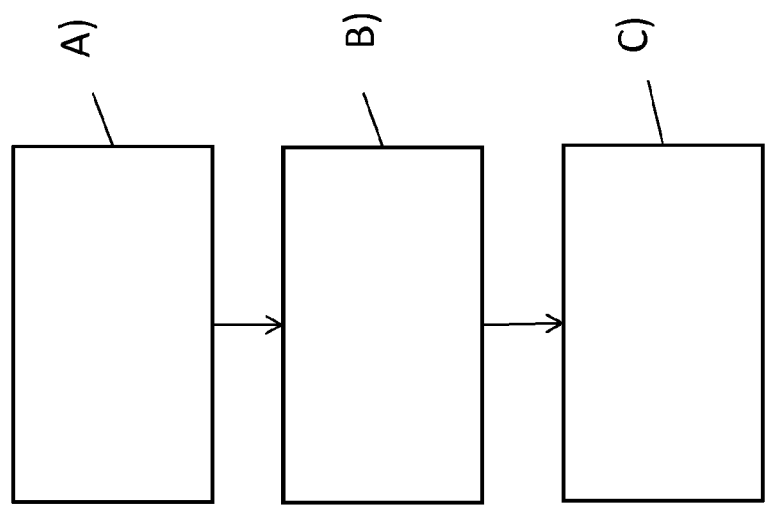
FIG. 4 shows steps of a method according to an embodiment of the present invention.

FIG. 4 shows steps of a method according to an embodiment of the present invention.

In FIG. 4, a method for performing a proof-of-retrievability is shown. The method includes the steps of:
A) Downloading by a client a current verification key of a file stored on a storage entity according to a storage method of one of the embodiments;
B) Verifying correctness of the verification key by reconstructing the current verification key using the last known verification key and the user-specific public identifiers incorporated into the verification key according to a storage method of one of the embodiments; and
C) Upon successful verification performing a proof-of-retrievability with the current verification key.

In summary, at least one embodiment of the present invention may leverage key and message homomorphic properties of BLS (Boney Lynn Shacham) signatures for constructing a storage-efficient publicly verifiable multi-tenant proof-of-retrievability, e.g. tags are updated or computed such that the updating and computing is homomorphic in the user-specific private identifier and in the respective file parts.

Embodiments of the present invention further enable a verification of tags updated by other untrusted tenants by verifying the inclusion of own's private key in the aggregated public key.

Further the present invention enables the deduplication of both the files and the proof-of-retrievablity tags across mutually trusted tenants.

Even further embodiments of the present invention do not require different tenants to share any secret material with each other.

Even further the embodiments of the present invention enables resistance against malicious proxy servers and cloud providers.

As described, an embodiment of the present invention relates to a method for storing data on a storage entity, 'SE', that includes the operations of: (a) computing a file identifier for a file to be stored on the SE; (b) checking, by the SE, if the file has already been stored using the file identifier; (c) generating a user-specific private and a user-specific public identifier; (d) updating or computing tags of the file by the client such that the updating or computing is homomorphic in the user-specific private identifier and in parts of the file; (e) providing the user-specific public identifier the updated tags and a proof of possession of the secret identifier to the SE by the client; (f) verifying by the SE, said proof-of-possession; (g) verifying validity of the tags; (h) upon successful checking storing a public identifier for the file incorporating the user-specific public identifier and the updated tags by the SE; and/or (i) if the file has not already been stored, storing the file by the SE.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing data on a storage entity (SE) comprising the steps of:

a) computing, by a client, a file identifier for a file to be stored on the SE;
   b) providing, by the client, the file identifier to the SE to check if the file has already been stored using the file identifier;
   c) generating, by the client, a user-specific private identifier and a user-specific public identifier, wherein generating the user-specific private identifier is based on using an oblivious key generation protocol between the client and a trusted entity, and wherein the user-specific private identifier is a deterministic private identifier;
   d) updating or computing, by the client, tags of the file such that the updating or computing is homomorphic in the user-specific private identifier and in parts of the file, wherein the file is divided into blocks, wherein each of the blocks comprises a number of sectors, wherein a file tag for each block is computed based on file elements sectors for the block and the user-specific private identifier, and wherein the file elements are computed based on a cryptographic hash function of the file and sector indices; and
   e) providing, by the client, the user-specific public identifier, the updated tags and a proof of possession of the user-specific private identifier to the SE to enable the SE to store information associated with the file based on the user-specific public identifier, the updated tags and the proof of possession of the user-specific private identifier.

2. The method according to claim 1, wherein the user-specific public identifier and/or the user-specific private identifier are computed as a public key/private key pair.

3. The method according to claim 1, wherein the file is encrypted and/or an information dispersal algorithm is applied on the file prior to storing.

4. The method according to claim 1, wherein the file identifier is generated by computing a hash tree and using a root of the hash tree as the file identifier.

5. The method according to claim 1, wherein the user-specific public identifier is locally stored by the client as a verification key.

6. The method according to claim 1, further comprising the step of: performing a proof of retrievability operation comprising the steps of:

A) downloading, by the client, a current verification key of the file stored on the SE;
   B) verifying, by the client, correctness of the current verification key by reconstructing the current verification key using a last known verification key and the user-specific public identifier incorporated into the current verification key; and
   C) in a case of a successful verification, performing, by the client, a proof-of-retrievability with the current verification key.

7. The method according to claim 1, wherein the file is stored in the storage entity together with the user-specific public identifier, the proof of possession and the tags.

8. The method according to claim 1, wherein all of the blocks have the same number of sectors.

9. The method according to claim 1, wherein the SE stores the information associated with the file by:

f) verifying, by the SE, the proof of possession;
   g) verifying, by the SE, validity of the tags;
   h) in a case of a successful checking, storing, by the SE, a public identifier for the file incorporating the user-specific public identifier and the updated tags; and
   i) in a case where the file has not already been stored, storing, by the SE, the file.

10. The method according to claim 3, wherein the information dispersal algorithm comprises erasure-coding.

11. The method according to claim 4, wherein the hash tree is a Merkle tree.

12. The method according to claim 6,
wherein the steps of performing the proof-of-retrievability operation further comprises computing and providing a random challenge to the SE, the random challenge comprising one or more of the blocks of the file and a corresponding randomly generated integer,
wherein the client receives, from the SE, the file tags and a sum of a product of the randomly generated integer and a sector corresponding to the integer, and
wherein the client verifies retrievability of the data using the file tags and the sum to generate corresponding file elements and comparing the generated file elements with locally stored file elements.

13. The method according to claim 9, wherein in a case where the file is already stored, verifying the validity of the tags is based on already stored elements of the file by the SE.

14. A non-transitory computer readable medium storing a program, the execution of which causes a computer to execute a method for storing on a storage entity (SE), the method comprising the steps of:
a) computing a file identifier for a file to be stored on the SE;
b) providing the file identifier to the SE to check if the file has already been stored using the file identifier;
c) generating a user-specific private identifier and a user-specific public identifier, wherein generating the user-specific private identifier is based on using an oblivious key generation protocol between a client and a trusted entity, and wherein the user-specific private identifier is a deterministic private identifier;
d) updating or computing tags of the file such that the updating or computing is homomorphic in the user-specific private identifier and in parts of the file, wherein the file is divided into blocks, wherein each of the blocks comprises a number of sectors, wherein a file tag for each block is computed based on file elements sectors for the block and the user-specific private identifier, and wherein the file elements are computed based on a cryptographic hash function of the file and sector indices; and
e) providing the user-specific public identifier the updated tags and a proof of possession of the user-specific private identifier to the SE to enable the SE to store information associated with the file based on the user-specific public identifier, the updated tags and the proof of possession of the user-specific private identifier.

15. A method for storing data on a storage entity (SE) comprising the steps of:
computing, by a client, a file identifier for a file to be stored on the SE;
providing, by the client, the file identifier to the SE to check if the file has already been stored using the file identifier;
generating, by the client, a user-specific private identifier and a user-specific public identifier, wherein generating the user-specific private identifier is based on using an oblivious key generation protocol between the client and a trusted entity, and wherein the user-specific private identifier is a deterministic private identifier;
updating or computing, by the client, tags of the file such that the updating or computing is homomorphic in the user-specific private identifier and in parts of the file;
providing, by the client, the user-specific public identifier, the updated tags and a proof of possession of the user-specific private identifier to the SE to enable the SE to store information associated with the file based on the user-specific public identifier, the updated tags and the proof of possession of the user-specific private identifier;
downloading, by the client, a current verification key of the file stored on the SE;
verifying, by the client, correctness of the current verification key by reconstructing the current verification key using a last known verification key and the user-specific public identifier incorporated into the current verification key; and
in a case of a successful verification, performing, by the client, a proof-of-retrievability with the current verification key.

16. The method according to claim 15, further comprising:
computing and providing a random challenge to the SE, the random challenge comprising one or more blocks of the file and a corresponding randomly generated integer.

17. The method according to claim 15, wherein the user-specific public identifier and/or the user-specific private identifier are computed as a public key/private key pair.

18. The method according to claim 15, wherein the file is encrypted and/or an information dispersal algorithm is applied on the file prior to storing.

* * * * *